Patented June 6, 1950

2,510,370

UNITED STATES PATENT OFFICE 2,510,370

COAGULATION OF SYNTHETIC LATEX

Willard F. Bixby, Cleveland, Ohio, assignor to The B. F. Goodrich Company, New York, N. Y., a corporation of New York No Drawing. Application July 25, 1946, Serial No. 686,153

5 Claims. (Cl. 260—29.7)

This invention relates to the coagulation of synthetic latices, particularly synthetic rubber latices prepared by polymerization in aqueous emulsion of a butadiene-1,3 hydrocarbon either alone or in admixture with a copolymerizable compound such as styrene or acrylonitrile, and has for its principal object the provision of a method whereby such latices may be coagulated to yield a coagulum which is substantially free from occluded electrolytes.

Synthetic rubber latices prepared by the polymerization in aqueous emulsion of monomeric material comprising a butadiene-1,3 hydrocarbon, are quite different from natural rubber latex in that they contain appreciable quantities of an emulsifying or dispersing agent, usually a soap, as well as small amounts of other materials used in the emulsion polymerization, and in that the size of the rubbery particles is only one-tenth or less to one-third as great as the size of the particles in natural rubber latex. Because of these differences, the coagulation of synthetic rubber latex to produce a rubbery coagulum reasonably free from foreign materials, is more difficult than with natural rubber latex, and is preferably carried out in such a manner that small discrete particles or crumbs of coagulum, which may be washed, filtered, and otherwise handled effectively, are first formed.

Several methods of coagulating synthetic latices so as to produce a fine crumb coagulum are known to the art. One of these, described in U. S. Patent 2,366,460 to Waldo L. Semon consists in intimately admixing turbulently flowing streams of synthetic latex and of a coagulant therefor such as an acid to form a slurry of small crumbs and then discharging the slurry of crumbs into a bath of agitated liquid. If the latex used in this method contains soap and the coagulant is an acid, the soap is converted into a soap-forming acid which may then be extracted and largely removed by use of an alkali in the bath of liquid, as is disclosed in U. S. Patent 2,378,732. Other coagulating methods effective in producing a fine crumb coagulum which may be readily washed, filtered and dried, consist in the controlled addition to the synthetic latex of a salt, such as sodium chloride, followed by addition of an acid, as is described in U. S. Patent 2,378,695, and in the use of alum or similar aluminum salt as the coagulating agent, as is described in U. S. Patent 2,378,693.

Although these coagulating methods have been widely used on a large scale in the production of synthetic rubber and are effective in producing an easily handled coagulum which is sufficiently free from foreign materials to be used for most purposes, all of these methods involve, essentially or preferably, the use of an electrolytic coagulating agent, and it has been found that the synthetic rubber obtained contains about 0.2% or more of occluded electrolyte which is so tightly held that it cannot be removed by repeated washing or leaching of the crumbs. The presence of this electrolyte is quite disadvantageous for some purposes, particularly when the product is to be used as electrical insulation.

My copending application Serial No. 442,350 filed May 9, 1942, now U. S. Patent 2,424,648, describes a method of continuously transforming a synthetic rubber latex into a synthetic rubber sheet, which method involves the coagulation of the latex to form a slurry containing small crumbs followed by the desposition of the crumbs on a pervious moving carrier and the pressing of the crumbs on the carrier into a sheet. In connection with this method, it is disclosed that clay may be added to the latex prior to coagulation thereof.

The present application is a continuation-in-part of the above-mentioned copending application Serial No. 442,350, and relates to this expedient of adding clay to synthetic latex prior to its coagulation, regardless of whether or not the coagulation is effected continuously and regardless of whether or not the coagulum is thereafter formed into a sheet.

It has been found that the presence of clay during the coagulation of synthetic rubber latices with or in the presence of an electrolyte, produces a coagulum in which the electrolyte content is only $1/100$ to $1/10$ as high as that of a coagulum obtained from the same latex using the same procedure but in the absence of clay. Because of the extremely low electrolyte content the products produced are quite useful as electrical insulation, possessing low water absorption and high electrical resistivity. Moreover, coagulation in the presence of clay is advantageous for other reasons since a more uniform and smaller size coagulum is secured and since the coagulum possesses increased porosity which permits of a faster drying rate.

In the practice of the invention a quantity of clay is intimately admixed with a synthetic rubber latex containing dispersed polymeric particles comprising a polymerized butadiene-1,3 hydrocarbon, in any desired manner as by adding the clay as such, or in aqueous dispersion, or in admixture with a coagulant, to the latex; and the latex is then coagulated in the presence of the added clay. The quantity of clay used is not critical and may be varied from as little as 0.5% or less based on the quantity of polymeric material in the latex, to as much as desired, but it is preferable to employ from about 1 to 10% of clay (on the same basis) since the electrolyte content is not lowered by increasing the quantity of clay above 10% and since the greater the amount of clay present during coagulation, the more clay is likely to be present in the coagulum. The variety of clay may also be varied, either fine clays such as colloidal clay or coarse clays being effective. Best results are secured when the clay is a variety which is neither unusually coarse or very fine and which possesses an average particle size of about 10 to 75 microns in diameter, such as the variety known as Dixie clay, which possesses particles ranging from 0.2 to 75 microns in diameter with an average size of about 30 microns.

Coagulation of the latex in the presence of clay may be effected by any of the usual methods for coagulating synthetic latices. It is preferable that the latex be coagulated by bringing it into contact with an electrolytic coagulating agent, preferably in such a manner as to yield a small crumb coagulum since the advantages of small crumb coagulation and the additional advantage of producing a coagulum of low electrolyte content are thereby attained. For example, one preferred method yielding a small crumb coagulum, especially effective with latices containing fatty acid soap as dispersing agent, is to add to the latex a salt such as sodium chloride, sodium sulfate, ammonium acetate or other salt comprising a monovalent cation and a monovalent anion, followed by the addition of a dilute acid such as sulfuric acid. Another method also yielding a small crumb coagulum consists in admixing the latex with a solution of a salt of a polyvalent metal, preferably an aluminum salt such as aluminum sulfate. Other methods of coagulation utilizing an electrolytic coagulating agent include the addition of acids such as acetic acid, formic acid, sulfuric acid, hydrochloric acid, etc. to latices in which the particles are negatively charged (as is the case when the dispersing agent is a fatty acid or rosin acid soap or other anionic soap), and the addition of bases such as sodium hydroxide or alkaline-reacting salts such as sodium carbonate to latices in which the particles are positively charged (as is the case when the dispersing agent is a cationic soap such as laurylamine hydrochloride). The use of a combination of an alcohol and a salt as coagulant is another method of coagulation which involves an electrolytic coagulant.

Although it is more difficult to coagulate synthetic latices without addition of an electrolyte, as by the use of an alcohol alone, or by agitation or by freezing, this is also possible; and the presence of clay during such a coagulation is advantageous because of increased permeability of the coagulum, which facilitates washing and drying, and because of a reduction in electrolyte content of the coagulum whenever electrolyte is present in the latex. (Some electrolyte may be present in the latex, as when used in the emulsion polymerization forming the latex, even though no electrolytic coagulant is added).

The coagulation procedure may be carried out in batches or continuously, continuous operation being preferable when operating on a large scale. After coagulation, the coagulum obtained is ordinarily separated from the latex serum, washed thoroughly, dewatered and dried. When the coagulation produces a slurry of small crumbs of coagulum, the slurry may be filtered, the crumbs reslurried and washed, again filtered, passed through a wash mill, if desired, and then dried, or the crumbs may be washed on a pervious carrier, pressed into a sheet on the carrier, and the sheet then dewatered and dried. If a fatty acid soap is present in the latex and is converted into water-insoluble fatty acid by the coagulation process, the fatty acid may be extracted with alkali while the coagulum is in crumb form and then washed and dried to yield a product of low fatty acid content. All of these expedients are known in connection with coagulation processes carried out in the absence of clay, but are of especial utility when the clay coagulation process of this invention is utilized.

As has been mentioned hereinabove, the latex which is coagulated in the presence of clay according to this invention is a synthetic latex containing dispersed polymer particles comprising a polymerized butadiene-1,3 hydrocarbon, such as is prepared by polymerization of a monomeric material comprising a butadiene-1,3 hydrocarbon in an aqueous emulsion. Examples of such latices include those prepared by polymerization in aqueous emulsion of butadiene-1,3, isoprene, 2,3-dimethylbutadiene-1,3 or piperylene either alone, in admixture with each other, or in admixture with one or more other compounds copolymerizable therewith in aqueous emulsion such as styrene, chlorostyrenes, acrylonitrile, methyl methacrylate, vinylidene chloride, vinyl pyridene, chloroprene and the like. Latices containing dispersed particles of other polymeric materials such as polyvinyl chloride, polystyrene, polyacrylonitrile, etc., combined with or in addition to the particles of butadiene-1,3 hydrocarbon polymer or copolymer, may also be used. In addition to the dispersed polymeric material such latices will also contain dispersing or emulsifying agents such as soaps or the like, and may contain other materials used during the polymerization or added thereafter, if desired.

The practice of the invention is illustrated in greater detail in the following specific examples in which all parts are by weight.

*Example 1*

A synthetic rubber latex, prepared by the polymerization of a monomeric mixture consisting of 65 parts of butadiene-1,3 and 35 parts of styrene in an aqueous emulsion also containing 180 parts of water, 5 parts of fatty acid soap as emulsifying agent, 0.3 part of potassium persulfate as a polymerization initiator, and 0.5 part of dodecyl mercaptan as a polymerization modifier, at a temperature of 50° C. for a time sufficient for about 80% of the monomeric mixture to be converted into polymer, is admixed with an aqueous dispersion of Dixie clay in proportions such that 1.2 parts of clay are present for each 100 parts of butadiene-1,3-styrene copolymer in the latex. The latex containing clay is then coagulated by first mixing the latex with a 10% aqueous solution of sodium chloride in proportions such that the volume of latex is about 5 times the volume of salt solution, and then adding a 2% aqueous solution of sulfuric acid at a rate sufficiently slow to maintain the pH at about 6.0 to 7.0 until coagulation is complete. The coagulum is obtained in the form of non-sticky, porous crumbs of about 2 to 3 mm. in diameter, which are then filtered from the latex serum, washed thoroughly and dried. The electrolyte content of the dried crumbs is then determined by ashing a sample, extracting the ash with a volume of water of known purity, measuring the electrical resistance of the extract by use of a modified Wheatstone bridge, and transforming the resistance of the sample into per cent electrolyte (calculated as % NaCl on the polymer) by comparison with known standards. It is thus found that the coagulum obtained in this example possesses an electrolyte content of 0.010%. When the example is repeated, however, except that no clay is used, the electrolyte content of the coagulum is 0.222%.

Examples 2 and 3

The procedure of Example 1 is twice repeated using two other synthetic latices containing polymer particles comprising polymerized butadiene-1,3 in place of the specific latex there described. In Example 2 the latex used is a synthetic rubber latex prepared by the polymerization of a monomeric mixture of 55 parts of butadiene-1,3 and 45 parts of acrylonitrile in an aqueous emulsion also containing 5 parts of fatty acid soap and small quantities of a polymerization initiator, a catalyst and a modifier, the polymerization having been effected at a temperature of 30° C. for a time sufficient to convert the monomers into butadiene-1,3 acrylonitrile copolymer. The latex used in Example 3 is a mixed latex obtained by mixing a quantity of a latex the same as used in Example 2 with an equal quantity of a polyvinyl chloride latex prepared by polymerizing vinyl chloride in an aqueous emulsion in the presence of fatty acid soap.

In both examples the coagulated polymeric materials obtained, using clay during the coagulation as in Example 1, possess electrolyte contents below 0.02%, but the electrolyte contents of polymeric materials obtained by coagulating the same latices in the same manner except in the absence of clay, are above 0.4%.

Example 4

A synthetic rubber latex, prepared by the polymerization of a mixture of 70 parts of butadiene-1,3 and 30 parts of styrene in an aqueous emulsion in the presence of fatty acid soap, in the same manner as in Example 1, is mixed with 1% of Dixie clay based on the polymer content of the latex, and is then coagulated by the salt-acid procedure described in Example 1. The crumbs of coagulum obtained are then extracted with caustic alkali at 60° C., filtered, washed twice with water at pH 10 and filtered, and finally washed with water to neutrality, to remove the fatty acid liberated from the soap on addition of acid during the coagulation. After drying, the extracted crumbs are found to possess an electrolyte content (determined as in Example 1) of only 0.006% and a very low fatty acid content (below about 0.2%). When proceeding in the same manner except that no clay is used, the coagulum obtained possesses low fatty acid content but its electrolyte content is 0.204%, thus again illustrating the remarkable effect of clay in obtaining polymers which are substantially electrolyte free.

The polymer obtained in this example is highly suitable for use as electrical insulation. For example, when it is compounded in a cable insulation compound in the following recipe:

| | Parts |
|---|---|
| Polymer | 100 |
| Zinc oxide | 10 |
| Sulfur | 2 |
| Stearic acid | 1 |
| 2-mercapto thiazoline | 1 |
| Butyraldehyde-aniline condensation product | 0.25 |
| Di(beta naphthyl) p-phenylene diamine | 1 |
| Mineral rubber | 40 |
| Atomite whiting | 40 |
| Paraffin wax | 1 | and then vulcanized, the vulcanizate possesses very low water absorption and high electrical resistivity, as well as good physical properties. Its water absorption is only 0.9% (expressed as % increase in wt. after 14 days immersion in water at room temperature) as compared to a value of 8.6% for a polymer treated throughout in the same manner except for the absence of clay during coagulation, and its electrical resistivity is significantly higher because of the considerably lower electrolyte content.

Examples 5 and 6

Example 4 is twice repeated varying the kind of clay and the manner in which it is introduced into the latex. In Example 5 bentonite clay is used in place of Dixie clay and in Example 6 the clay is introduced into the latex in admixture with the acid coagulant. The electrolyte content of the coagulated polymers is as follows:

| | Per cent electrolyte |
|---|---|
| Example 5 | 0.045 |
| Example 6 | 0.009 |

It is seen that the use of bentonite clay also lowers electrolyte content, although not to as great an extent as Dixie clay, and that substantially the same results are secured when the clay is added with the coagulant as when first mixed with the latex. When other protective colloids such as glue are substituted for clay, however, the electrolyte content is still high, being about 0.15 to 0.20%, so that the advantages of this invention are not secured by their use.

Examples 7 to 9

The procedure of Example 4 is again repeated varying the quantity of Dixie clay used. The amount of clay and the electrolyte content of the coagulum for these examples are as follows:

| | Amount of Clay (per cent on polymer) | Electrolyte Content (percent on polymer) |
|---|---|---|
| Example 7 | 0.5 | 0.070 |
| Example 8 | 5.0 | 0.007 |
| Example 9 | 10.0 | 0.007 |

Example 10

A synthetic rubber latex prepared by the polymerization of 75 parts of butadiene-1,3 and 25 parts of styrene in an aqueous emulsion containing 5 parts of fatty acid soap, is admixed with an aqueous dispersion of clay in an amount such that 5% of clay based on the butadiene-1,3 styrene copolymer synthetic rubber is used. The latex containing clay is then added to a 5% aqueous alum solution whereupon coagulation occurs to form an aqueous slurry containing small crumbs of coagulum. The slurry is filtered and the crumbs washed and dried. The synthetic rubber obtained in this manner is found to possess (when tested as in Example 1) an electrolyte content of 0.02% whereas the electrolyte content of a coagulum obtained in the same manner except in the absence of clay possesses an electrolyte content of 0.26%.

When the synthetic rubber of this example is compounded in the cable recipe of Example 4 and vulcanized, the vulcanizate is found to possess a water absorption of 0.9% (% increase in weight after 14 days immersion in water at room temperature) and a dry vol. resistivity at 90° F. (expressed in $\log_{10}$ ohms/cm.$^3$) of 11.6. The corresponding dry vol. resistivity of a similar polymer coagulated in the absence of clay is only about 10.5.

The above examples illustrate various embodiments of the invention and demonstrate the advantages thereof. It is to be understood however that the invention is not limited thereto since numerous modifications and variations therein, as in the nature of the latex used and in the procedure for coagulating the latex and treating the coagulum, will occur to those skilled in the art, and may be effected while still obtaining the advantages described and without departing from the spirit and scope of the appended claims.

I claim:

1. The process of producing raw unvulcanized butadiene-1,3 hydrocarbon polymer of low electrolyte content and suitable for use in preparing electrical insulating compositions of low water absorption and high electrical resistivity which comprises intimately admixing a synthetic latex prepared by the polymerization in aqueous emulsion in the presence of a water-soluble soap as emulsifying agent of a monomeric material comprising a butadiene-1,3 hydrocarbon, with from 0.5 to 10% by weight based on the polymer content of the latex of a clay having an average particle size of 10 to 75 microns in diameter, and with an electrolytic coagulating agent which converts the soap into water-insoluble material, in an amount sufficient to so convert the soap present and thereby irreversibly coagulate the latex in the presence of the clay to produce an aqueous slurry containing discrete crumbs of polymeric coagulum, separating the coagulum from the surrounding aqueous medium and drying the coagulum.

2. The method of claim 1 wherein the clay is Dixie clay.

3. The method of claim 1 wherein the synthetic latex is prepared by the polymerization of a monomeric mixture of butadiene-1,3 and styrene.

4. The process of preparing raw unvulcanized butadiene-1,3 styrene copolymer of low electrolyte content and suitable for use in preparing electrical insulating compositions of low water absorption and high electrical resistivity which comprises intimately admixing a synthetic latex prepared by the polymerization in aqueous emulsion in the presence of a water-soluble fatty acid soap as emulsifying agent, of a monomeric mixture of butadiene-1,3 and styrene, with from 1 to 10% by weight, based on the polymer content of the latex, of Dixie clay, adding to the latex containing clay a salt and a sufficient quantity of an acid to convert the fatty acid soap to fatty acid and thereby irreversibly coagulate the latex to produce an aqueous slurry containing discrete crumbs of polymeric coagulum, separating the coagulum from the surrounding aqueous medium and drying the coagulum.

5. The process of preparing raw unvulcanized butadiene-1,3 styrene copolymer of low electrolyte content and suitable for use in preparing electrical insulating compositions of low water absorption and high electrical resistivity which comprises intimately admixing a synthetic latex prepared by the polymerization in aqueous emulsion in the presence of a water-soluble fatty acid soap as emulsifying agent, of a monomeric mixture of butadiene-1,3 and styrene, with from 1 to 10% by weight, based on the polymer content of the latex, of Dixie clay, adding the latex containing clay to an aqueous solution of an aluminum salt in a quantity sufficient to convert the water-soluble fatty acid soap to water-insoluble aluminum soap and thereby irreversibly coagulate the latex to produce an aqueous slurry containing discrete crumbs of polymeric coagulum, separating the coagulum from the surrounding medium and drying the coagulum.

WILLARD F. BIXBY.

REFERENCES CITED

The following references are of record in the file of this patent:

UNITED STATES PATENTS

| Number | Name | Date |
|---|---|---|
| 2,340,358 | Young | Feb. 1, 1944 |
| 2,378,693 | Fryling | June 19, 1945 |
| 2,378,695 | Fryling | June 19, 1945 |
| 2,378,882 | Habib | June 19, 1945 |
| 2,414,391 | Peaker | Jan. 14, 1947 |